July 14, 1936.  J. G. DELY  2,047,550
REGENERATION OF COPPER AMMONIA SOLUTIONS USED
TO ABSORB CARBON OXIDES AND OXYGEN
Filed March 7, 1933
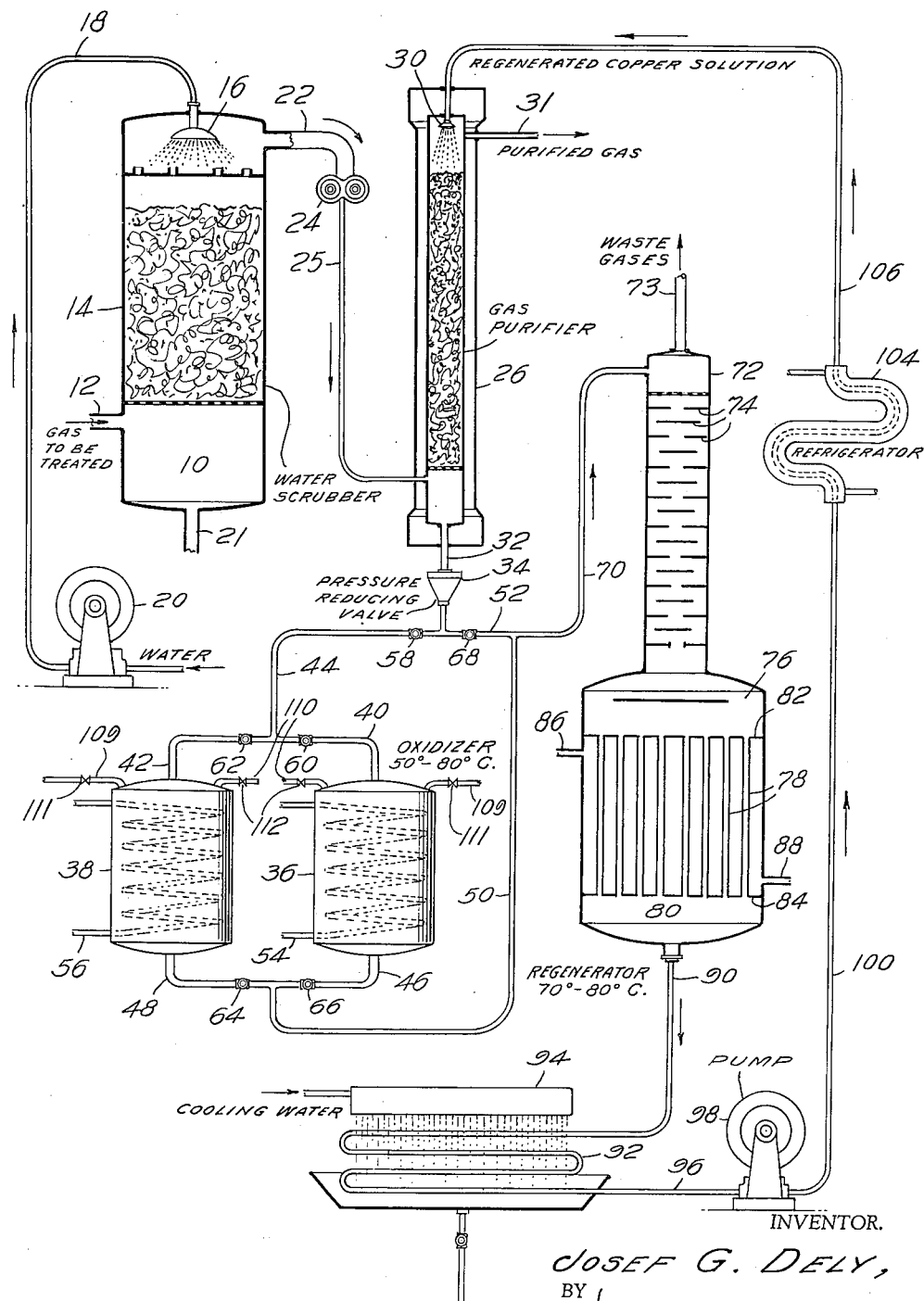
INVENTOR.
JOSEF G. DELY,
BY
ATTORNEY.

Patented July 14, 1936

2,047,550

UNITED STATES PATENT OFFICE 2,047,550

REGENERATION OF COPPER AMMONIA SOLUTIONS USED TO ABSORB CARBON OXIDES AND OXYGEN

Josef G. Dely, Queens Village, N. Y., assignor, by mesne assignments, to Chemical Construction Corporation, a corporation of Delaware Application March 7, 1933, Serial No. 659,929

3 Claims. (Cl. 23—7)

This invention relates to gas purification and it has particular relation to methods of and apparatus for purification of nitrogen-hydrogen mixtures used in the synthesis of ammonia.

The main objects of the invention are to provide an improved method of and apparatus for maintaining the most efficient ratio between cuprous and cupric copper in ammoniacal cuprous solutions used to absorb carbon monoxide, oxygen and carbon dioxide in nitrogen-hydrogen mixtures; a method of treatment of ammoniacal cuprous solutions prior to regeneration whereby balance of cuprous and cupric copper is maintained without treatment of the gases during regeneration with oxygen; a method of treatment of spent solutions of copper ammonia salts whereby the oxygen and carbon monoxide present in the spent solution is used to maintain an effective balance between cuprous and cupric copper in the solution; and the method of treatment for controlling the ratios of cuprous and cupric ammonia solutions involving control of temperatures and rates of flow of the spent liquors to effect a predetermined balance of cuprous and cupric copper.

In the direct synthesis of ammonia from mixtures of hydrogen and nitrogen, the initial or primary gases are passed over a suitable contact catalyst under heat and pressure whereby chemical union between the two gases in the proper proportions is effected. The hydrogen-nitrogen mixture employed is obtained commonly from water gas or mixtures of water gas with other suitable gases. This primary supply of gas consisting of nitrogen, hydrogen, carbon monoxide, carbon dioxide is subjected to preliminary catalyzation in the presence of steam whereby carbon dioxide is formed from the carbon monoxide and additional hydrogen is produced. The major portion of the carbon dioxide is removed by scrubbing the gaseous mixture with water at ordinary temperatures in suitable pressure scrubber towers.

By such treatment the carbon dioxide content may be reduced to 1% or even less. Subsequent to the removal of the bulk of the carbon dioxide in the water scrubber, the gas is passed through a scrubber tower where it is treated with a solution of ammoniacal cuprous salts at low temperature and the remaining $CO_2$ is removed together with the greater part of CO and $O_2$.

According to the usual practice, these ammoniacal solutions of cuprous salts after they have absorbed a reasonable amount of carbon monoxide are regenerated by passing the solutions into a suitable container where they are heated for considerable periods (some thirty minutes more or less) to a temperature of some 70° or 80° C. under approximately atmospheric pressures. During regeneration the carbon oxides are liberated from the solution and any cupric salts resulting from the absorption of oxygen in the scrubber are reduced to cuprous salts by reaction with carbon monoxide. The solution may then be cooled and returned to the system for re-use in the removal of additional carbon monoxide.

This method of regeneration is accompanied by certain undesirable effects. There is a tendency for the carbon monoxide at the temperatures of regeneration excessively to reduce the ammoniacal copper solution, thus liberating metallic copper which tends to deposit in and thus to clog the conduits used in conveying the liquid. The absorptive capacity of the solution for CO is thereby lowered.

It has heretofore been proposed to compensate for this undesirable excessive reduction of the ammoniacal copper solution by introducing into the solution during regeneration, air or other suitable oxidizing agent, whereby a satisfactory balance of cupric copper is maintained in the system and the over-reduction of cuprous copper with precipitation of metallic copper is prevented.

Oxygen, in fact, is unavoidably present in the gases treated by the copper solution and is absorbed by this solution, by reason of the fact that the washing water is itself more or less saturated with oxygen and will lose at least a part of it to the gases washed therewith.

I have now discovered that the rate of reduction of the copper salts by CO during regeneration is influenced by the temperature of the solution, the time of heating and the concentration of CO in contact therewith, and that by reducing the time during which the solution remains heated and arranging the heater so that the CO leaves freely and does not remain in contact with the solution, I can conduct the regeneration of the solution in such way that the oxygen normally present in the gas and absorbed by the solution more than balances the reducing effect of the CO during regeneration. The net result is a slow oxidation of the copper solution to the cupric salt.

I have made the further discovery that this excess oxidation may be compensated by subjecting the spent copper ammonia solution containing carbon monoxide and cupric copper to controlled conditions of heat, and pressure or concentration of CO for a sufficient length of time prior to regeneration. This treatment results in a reduction of cupric copper to the cuprous state, and if the duration and temperature of heating and the concentration of CO are properly controlled, results in maintenance of the ratio of cupric and cuprous copper at the optimum value for greatest efficiency for the removal of carbon monoxide from the hydrogen-nitrogen gas without any further treatment.

For a better understanding of the invention, reference may now be had to the accompanying drawing in which the single figure is a conventionalized diagram of a system embodying the principles of my invention.

The invention as disclosed in the drawing comprises a scrubber tower 10 into the bottom of which a mixture of gases consisting of hydrogen, nitrogen, carbon monoxide and carbon dioxide is introduced through a conduit 12. A packing 14 of a conventional character is provided in the tower and the gases in passing therethrough are washed with water supplied by a sprinkler 16 connected by a conduit 18 to a suitable pump 20. Wash water is drained from the tower by a conduit 21.

The relative pressure in the water scrubber may vary with respect to that employed during the scrubbing with ammoniacal cuprous solution. In the specific form of apparatus shown, relatively low pressure is employed in the water scrubber and a higher pressure is employed during the step of scrubbing with the ammoniacal cuprous solution. Accordingly, a conduit 22 near the top of the scrubber 14 leads to a suitable compression mechanism 24 that supplies gas under relatively high compression through the conduit 25 to the base of a second scrubber tower 26. However, if preferred, the mechanism 24 may be eliminated and low pressure may be employed in the tower 26. This tower contains a conventional packing 28, and a sprinkler 30 at the top of the tower discharges fresh ammoniacal cuprous solution which travels down through the packing in intimate contact with the rising stream of gases. A conduit 32 conveys the spent solution from the bottom of the scrubber tower and a valve 34 functions to withdraw the solution from the tower.

Suitable apparatus for the elimination of the excess oxygen in the spent solution comprises a pair of closed receptacles or tanks 36 and 38, which are respectively connected by conduits 40 and 42 to a common conduit 44 leading to the valve 34. Conduits 46 and 48 at the bottoms of the receptacles discharge into a conduit 50. This latter conduit is also joined to a by-pass conduit 52 which connects to the conduit 44 and thus serves, if desired, to by-pass the receptacles 36 and 38. The receptacles are provided with steam coils 54 and 56, whereby the temperature of the solution in the containers may be maintained at any predetermined value desired for deoxidizing the spent solutions. It will be observed that the conduits 44, 40, 42, 48, 46, and 52 are respectively provided with valves 58, 60, 62, 64, 66, and 68, whereby spent liquor may be diverted to tank 36 or 38 and discharged therefrom through the conduit 50 or the liquors may be entirely by-passed by means of the conduit 52.

Conduits 50 and 52 at their junction connect to a conduit 70 leading to a reflux tower or column 72, which is provided with an exit 73 for carbon minoxide and dioxide. The usual arrangement of baffles 74 through which the spent liquor trickles is provided in the tower. The tower at its base opens into a header chamber 76 and this chamber is connected by means of tubes 78 with a second or bottom chamber 80. The tubes 78 at their upper and lower ends extend through plates 82 and 84 which provide a steam chamber enclosing the tubes, which is supplied with steam or other convenient heating medium by means of inlet and outlet conduits 86 and 88.

A conduit 90 conveys regenerated liquor from the bottom of the chamber 80 to a set of cooling coils 92 which are cooled by a spray of water from a suitable sprinkler 94. The cooled liquid from the coil passes through a conduit 96 to a pump 98 and from the latter is discharged through conduit 100 back to scrubbing tower 26. If a low temperature (0° C. to 10° C.) is employed in the operation of scrubbing the raw gases with ammoniacal cuprous solution, a second cooling coil 102 having a jacketing tube 104 for brine may be connected to the conduit 100. However, under some conditions of operation this coil may be eliminated. In the apparatus shown, the ammoniacal cuprous solution returns to tower 26 through conduit 106.

For purposes of controlling the pressure of gases in the containers 36 and 38, they are each provided at the upper ends thereof with a pair of conduits 109 and 110 having respectively control valves 111 and 112. The first of these conduits permits escape of gases confined in the containers, while the second may be used to supply carbon monoxide in case there is a deficiency of that gas. This latter method is particularly useful in purifying gases containing oxygen and little or no carbon monoxide.

The operation of the improved system is practically self-evident from the preceding discussion of the apparatus. A suitable mixture of gases prepared by the catalyzation of water gas and steam or other suitable gases and comprising for example approximately 17% nitrogen, 52% hydrogen, 2% carbon monoxide and 29% of carbon dioxide is admitted to the scrubber tower 10 by the conduit 12 and passes upwardly through the packing 14 in the tower in countercurrent flow to a spray of wash water from the sprinkler 16. This washing preferably is effected at 16 or 17 atmospheres pressure and in general a sufficient amount of water will be used in the washing to effect the desired reduction in the carbon dioxide content of the gas. By such treatment the carbon dioxide will be reduced to from 29% to 1% or even less. At the same time the reduction of carbon dioxide is effected a small amount (in the order of one-tenth of 1%) of oxygen is introduced into the gaseous mixture.

The mixture containing from 2 to 4% carbon oxides, about .1% $O_2$ leaves the scrubber tower through the conduit 22 and is subsequently admitted through the conduit 25 to the base of the scrubbing tower 26 where it passes upwardly through the packing 28 in countercurrent flow to a spray of fresh ammoniacal cuprous solution from the sprayer 30. In this tower substantially all of the carbon oxides and oxygen can be absorbed by the cuprous solution. The purified gases are discharged from the tower through the conduit 31 and may pass directly to a suitable converter mechanism (not shown) or may be passed through further purification apparatus (not shown).

The analysis of the cuprous ammonia solution may vary over a fairly wide range. However, in actual practice it is found that optimum results are obtained when a solution of approximately 14% cuprous copper and 2% cupric copper is employed. If the proportion of cupric copper drops much below 2%, there is danger of the deposition of metallic copper. On the other hand, increase of the cupric copper results in reduced efficiency of the system because of the formation of cupric oxide which is not absorbent medium for carbon monoxide.

The spent solution from the tower 26 is withdrawn through valve 34 and discharged into one of the tanks 36 or 38.

In tanks 36 or 38 the degree of deoxidation is controlled by varying the temperature, the quantity of CO in contact with the solution, and the duration of the treatment. Normally the solution is subjected to a temperature of 40° to 70° C. for some thirty minutes and the CO is allowed to escape freely from the solution through conduits 109. If the concentration of cupric copper is so high that the normal treatment described above does not result in sufficient deoxidation, the pressure of the CO in contact with the solution may be increased by closing valves 111, or in exceptional cases additional CO may be admitted through valves 112. By these treatments the excess cupric copper is reduced to cuprous copper and the oxygen thus released is converted into carbon dioxide. It will be observed that the tanks 36 and 38 are arranged parallel with respect to each other so that one may be filling and heating while the other is discharging into the tower 72. If desired, only a portion of the spent liquor may be withdrawn from circulation into the tanks 36 and 38 and there subjected to relatively strong deoxidization. This highly de-oxidized solution may then be admixed with the remainder of the solution in the system in such proportions as to bring the ratio of cupric to cuprous copper to the desired value.

After reduction of excess cupric copper and elimination of the oxygen, the spent solution discharges into the tower 72 and passes downwardly through the tubes 78 where it is warmed to a temperature of 70° to 80° C. more or less and is subjected to approximately atmospheric pressures.

The flow of the solution through the regenerator should be relatively rapid and in general a period of about one minute in the zone of the tubes 78 is sufficient and the apparatus should be so designed as to obtain a rate of flow of approximately this order. During the period of regeneration, there need be no storage of solution in the tubes or in the chambers 76 or 80. The rate of passage of the solution through the column 72 is relatively rapid because there is no head of liquid and the drop from baffle to baffle is free. In view of this fact and in view of the fact that the solution in the column is comparatively cool, but little regeneration or reduction occurs during the passage through the column.

Under these conditions the complex of ammoniacal cuprous copper and carbon monoxide is broken up completely and the carbon monoxide and carbon dioxide contained in the solution escapes through the conduit 73. The major portion of the ammonia driven off as the liquor passes downwardly through the tower, passes upwardly and is reabsorbed by the cool spent liquor in the upper part of the tower. The gases which contain some ammonia not re-absorbed, which it is desired to save, may be passed through a suitable scrubbing device (not shown) for the removal of the ammonia. The gases consisting mainly of carbon monoxide may be then returned to the original gas mixture and subjected to catalyzation in the presence of steam whereby to convert the carbon monoxide into carbon dioxide and to release additional hydrogen.

There need be no static head of liquor in the chambers 76 and 80 and a shorter period for regeneration and freer escape of gases are attained without such static heads.

The regenerated solution from the scrubber tower passes through the cooling coils 92 and is then discharged by the pump into the tower 26 by the sprayer 30.

Under most circumstances using the gaseous mixture described and the conditions specified in connection with the apparatus, it will be found easy to maintain the balance between the cuprous and the cupric copper in the solution well within the limits desired for optimum operating efficiency of the solution. Of course, operating conditions will vary. Accordingly, it is desired that the specific values set forth for the operation of this system are not to be considered as being absolute; instead, they are merely typical. Under some conditions it may be found that the percentage of oxygen is higher than under other conditions and therefore stronger heating for longer periods of time in the de-oxidizing tanks 36 and 38 may be required. Under such circumstances it is only necessary to continue the heating until analysis of the copper ammonia solution shows the right ratio between cuprous and cupric copper.

Under some operating conditions it may even be found that the percentage of carbon monoxide in the spent liquor is too low to effect the desired reduction of the cupric copper to cuprous copper. When this occurs the necessary balance may be obtained by the supply of carbon monoxide to the tanks 36 and 38 through the conduits 109. The liquid containing this added carbon monoxide is then subjected to de-oxidization by heating in the tanks 36 and 38 in the usual manner.

The apparatus embodied in the invention is relatively simple in character. By use of this apparatus the ammoniacal copper solution may be maintained at the optimum value for obtaining the most satisfactory absorption of carbon monoxide at all times and adjustments may readily be made to compensate for variations in local operation conditions. Also these desirable results are obtained without the inconvenience and expense of subjecting the copper solution to blowing with air or other oxidizing agents.

Although I have shown and described only the preferred embodiment of the invention, it is to be understood that the invention is not limited to the specific form disclosed but that numerous modifications may be made therein without departure from the spirit of the invention or the scope of the appended claims.

What I claim is:

1. A method of regenerating ammoniacal cuprous solutions used to absorb carbon oxides and oxygen, which comprises heating the solution to a temperature sufficient to effect a gradual reducing action upon the oxygen by carbon monoxide, then quickly heating the solution to a higher temperature to expel the carbon oxides to regenerate the solution, the solution intermediate the stages of heating being brought into intimate and repeated contact with the ammonia expelled during the second stage of heating.

2. A method of regenerating ammoniacal cuprous solutions used to absorb carbon oxides and oxygen, which comprises heating the solution to a temperature sufficient to produce an effective reducing action upon the oxygen content of the solution for a time sufficient to bring the oxygen contents approximately to an optimum value without complete regeneration of the solution, then quickly completing the regeneration by heating the solution while it is in rapid flow without material storage and causing the solution while passing from one stage of heating to the other to absorb the ammonia evolved in the second stage by passing said ammonia in intimate and repeated contact with the solution.

3. An apparatus for renegerating ammoniacal cuprous solutions used for removing carbon oxides and oxygen from hydrogen and nitrogen mixtures in the Haber process comprising a container for heating the solution under hydrostatic head to reduce excess oxygen, a second container for heating the solution to expel carbon oxides to regenerate the solution, and a vessel intermediate the two containers having gas and liquid contact means for contacting the solution with ammonia expelled in the second container.

JOSEF G. DELY.